(12) United States Patent
Wen et al.

(10) Patent No.: US 7,577,650 B2
(45) Date of Patent: Aug. 18, 2009

(54) METHOD AND SYSTEM FOR RANKING OBJECTS OF DIFFERENT OBJECT TYPES

(75) Inventors: Ji-Rong Wen, Beijing (CN); Wei-Ying Ma, Beijing (CN); Zaiqing Nie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 571 days.

(21) Appl. No.: 11/106,017

(22) Filed: Apr. 13, 2005

(65) Prior Publication Data

US 2006/0235810 A1    Oct. 19, 2006

(51) Int. Cl.
G06F 7/06 (2006.01)
G06F 7/10 (2006.01)
G06F 17/30 (2006.01)

(52) U.S. Cl. .................. 707/5; 707/104.1; 707/3; 707/4

(58) Field of Classification Search ............. 707/104.1, 707/5

See application file for complete search history.

(56) References Cited

U.S. PATENT DOCUMENTS

| | | | | |
|---|---|---|---|---|
| 6,601,075 | B1* | 7/2003 | Huang et al. | 707/104.1 |
| 7,062,488 | B1* | 6/2006 | Reisman | 707/8 |
| 2003/0093423 | A1* | 5/2003 | Larason et al. | 707/5 |
| 2003/0177118 | A1* | 9/2003 | Moon et al. | 707/5 |
| 2003/0212663 | A1* | 11/2003 | Leno et al. | 707/3 |
| 2005/0171946 | A1* | 8/2005 | Maim | 707/5 |
| 2005/0192955 | A1* | 9/2005 | Farrell | 707/5 |

OTHER PUBLICATIONS

Brian Amento and Loren Terveen and Will Hill, "Does "authority" mean quality? predicting expert quality ratings of Web documents", 2000, ACM Press, Proceedings of the 23rd annual international ACM SIGIR conference on Research and development in information retrieval, 296-303.*

Kazai, G.; Lalmas, M.; Rolleke, T., "A model for the representation and focused retrieval of structured documents based on fuzzy aggregation," String Processing and Information Retrieval, 2001. SPIRE 2001. Proceedings.Eighth International Symposium on , vol.., No., pp. 123-135, Nov. 13-15, 2001.*

Wensi Xi and Jesper Lind and Eric Brill, "Learning effective ranking functions for newsgroup search", SIGIR '04: Proceedings of the 27th annual international ACM SIGIR conference on Research and development in information retrieval, 2004, ACM Press, New York, NY, pp. 394-401.*

(Continued)

Primary Examiner—Kuen S Lu
Assistant Examiner—Patrick E Sweeney
(74) Attorney, Agent, or Firm—Perkins Coie LLP

(57) ABSTRACT

A method and system for ranking objects of different object types based on their popularity is provided. A ranking system calculates the popularity of objects based on relationships between the objects. A relationship indicates how one object is related to another object. Thus, objects of one object type may have one or more relationships with objects of another object type. One goal of the ranking system is to rank the objects of the different object types based on their popularity. The objects and their relationships can be represented using a graph with nodes representing objects and links representing relationships between objects. The ranking system assigns a popularity propagation factor to each relationship to represent its contribution to the popularity of objects of that type.

18 Claims, 9 Drawing Sheets

OTHER PUBLICATIONS

U.S. Appl. No. 10/846,835, filed May 14, 2004, Zhang et al.
U.S. Appl. No. 11/106,383, filed Apr. 13, 2005, Wen.
Naveen Ashish and Craig Knoblock, Wrapper Generation for Semi-structured Internet Sources, Information Sciences Institute and Department of Computer Science, University of Southern California.
Audrey Balmin, Vagelis Hristidis, & Yannis Papakonstantinou, ObjectRank: Authority-Based Keyword Search in Databases, Proceedings of the 30th VLDB Conference, Toronto, Canada, 2004; pp. 564-575.
Sergey Brin & Lawrence Page, The Anatomy of a Large-Scale Hypertextual Web Search Engine, Computer Science Department, Stanford University.
Deng Cai, Xiaofei He, Ji-Rong Wen, & Wei-Ying Ma, Block-level Link Analysis, SIGIR, Sheffield, South Yorkshire, UK, Jul. 2004.
Junghoo Cho & Sourashis Roy, Impact of Search Engines on Page Popularity, Copyright WWW2004, New York, NY.
Lin Guo, Feng Shao, Chavdar Botev & Jayavel Shanmugasundaram, Xrank: Ranked Keyword Search over XML Documents, SIGMOD 2003, San Diego, CA.
Bin He, Kevin Chen-Chuan Chang & Jiawei Han, Discovering Complex Matchings across Web Query Interfaces: A Correlation Mining Approach, KDD Aug. 2004, Seattle, Washington.
S. Kirkpatrick, C. D. Gelatt, Jr., & M. P. Vecchi, Optimization by Simulated Annealing, Science, May 13, 1983, vol. 220, No. 4598.
Kleinberg, Jon M., Authoritative Sources in a Hyperlinked Environment, Department of Computer Science, Cornell University.
Nicholas Kushmerick, Daniel S. Weld & Robert Doorenbos, Wrapper Induction for Information Extraction, IJCAI-97.
Bing Liu, Robert Grossman & Yanhong Zhai, Mining Data Records in Web Pages, SIGKDD, Washington, DC, 2003.
L. Page, S. Brin, R. Motwani & T. Winograd, The PageRank Citation Ranking: Bringing Order to the Web, Technical Report, Stanford Digital Libraries, 1998.
Ruihua Song, Haifeng Liu, Ji-Rong Wen & Wei-Ying Ma, Learning Block Importance Models for Web Pages, WWW 2004, New York, NY.
Sheila Tejada, Craig A. Knoblock & Steven Minton, Learning Domain-Independent String Transformation Weights for High Accuracy Object Identification, SIGKDD, Edmonton, Alberta, 2002.
Jiying Wang, Ji-Rong Wen, Frederick H. Lochovsky & Wei-Ying Ma, Instance-based Schema Matching for Web Databases by Domain-specific Query Probing, VLDB, Toronto, Canada 2004.
Wensi Xi, Benyu Zhang, Zheng Chen, Yizhou Lu, Shuicheng Yan, Wei-Ying Ma & Edward A. Fox, Link Fusion: A Unified Link Analysis Framework for Multi-Type Interrelated Data Objects, WWW 2004, New York, NY.
CiteSeer.IST, Computer and Information Science Papers CiteSeer Publications ResearchIndex (1 page) http://citeseer.ist.psu.edu/cis?q=&submit=Search+Documents&cs=1.

* cited by examiner

METHOD AND SYSTEM FOR RANKING OBJECTS OF DIFFERENT OBJECT TYPES

TECHNICAL FIELD

The described technology relates generally to ranking objects of different types and particularly to ranking objects based on their popularity.

BACKGROUND

Many search engine services, such as Google and Overture, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, a search engine service may maintain a mapping of keywords to web pages. The search engine service may generate this mapping by "crawling" the web (i.e., the World Wide Web) to extract the keywords of each web page. To crawl the web, a search engine service may use a list of root web pages and identify all web pages that are accessible through those root web pages. The keywords of any particular web page can be extracted using various well-known information retrieval techniques, such as identifying the words of a headline, the words supplied in the metadata of the web page, the words that are highlighted, and so on. The search engine service may calculate a score that indicates how to rank the web pages based on the relevance of each web page to the search request, web page popularity (e.g., Google's PageRank), and so on. The search engine service then displays to the user the links to those web pages in the order indicated by the scores. Search engines may more generally provide searching for information in any collection of documents. For example, the collections of documents could include all U.S. patents, all federal court opinions, all archived documents of a company, and so on.

Two well-known techniques for ranking web pages are PageRank and HITS ("Hyperlinked-Induced Topic Search"). PageRank is based on the principle that web pages will have links to (i.e., "outgoing links") important web pages. Thus, the importance of a web page is based on the number and importance of other web pages that link to that web page (i.e., "incoming links"). In a simple form, the links between web pages can be represented by matrix A, where $A_{ij}$ represents the number of outgoing links from web page i to web page j. The importance score $w_j$ for web page j can be represented by the following equation:

$$w_j = \Sigma_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." Hub is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following incoming and outgoing links. HITS submits a query to a search engine service and uses the web pages of the results as the initial set of web pages. HITS adds to the set those web pages that are the destinations of incoming links and those web pages that are the sources of outgoing links of the web pages of the result. HITS then calculates the authority and hub score of each web page using an iterative algorithm. The authority and hub scores can be represented by the following equations:

$$a(p) = \sum_{q \to p} h(q)$$

and $$h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j, \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of web logs, $b_{ij}$ of the adjacency matrix can be increased whenever a user travels from web page i to web page j.

These search engines generally treat an entire web page as the smallest unit for retrieval and ranking. There are, however, various kinds of objects that can be referenced (e.g., embedded) in a static web page or a web database. These objects may include products, people, papers, organizations, and so on. Various techniques have been used to identify information from web pages that applies to the same object. The collection of such information for an object is referred to as a "web object." Although the ranking of web pages can provide useful information about the popularity of a web page overall, the ranking of web pages may not reflect the popularity of the various objects within a web page. For example, an unpopular web page may include a description of a popular product, and conversely a popular web page may include a description of an unpopular product. As a result, the popularity of an object referenced by a web page is not necessarily the same as the popularity of the web page itself.

It would be desirable to have a technique for determining the popularity of objects of web pages so that objects can be ranked based on their popularity. It would also be desirable to have a technique for ranking objects of different object types based on the popularity of the objects of the different object types.

SUMMARY

A method and system for ranking objects of different object types based on their popularity is provided. A ranking system calculates the popularity of objects based on relationships between the objects. A relationship indicates how one object is related to another object. Thus, objects of one object type may have one or more relationships with objects of another object type. One goal of the ranking system is to rank the objects of the different object types based on their popularity. The objects and their relationships can be represented using a graph with nodes representing objects and links representing relationships between objects. The ranking system assigns a popularity propagation factor to each relationship to represent its contribution to the popularity of objects of that type. The ranking system may calculate the popularity of the objects based on the popularity of the web pages that contain the objects and an object-level popularity. The ranking system may use a page ranking algorithm to determine the popularity of web pages that contain the objects. The ranking system may determine the object-level popularity of the objects based on the intra-type and inter-type relationships between the objects. The ranking system may also automatically calculate the popularity propagation factors for the relationships for a collection of objects.

DETAILED DESCRIPTION

A method and system for ranking objects of different object types based on their popularity is provided. In one embodiment, a ranking system calculates the popularity of objects based on relationships between the objects. A relationship indicates how one object is related to another object. Thus, objects of one object type may have one or more relationships with objects of another object type. For example, if the domain of the objects relates to scientific research, then the object types may include conference, journal, paper, and author. The relationships between these object types may include a "presented at" relationship between a paper and a conference, a "presented in" relationship between a paper and a journal, an "authored by" relationship between a paper and an author, and so on. One goal of the ranking system is to rank the objects of the different object types based on their popularity. For example, the ranking system ranks authors based on their popularity. An author who authors popular papers that are presented in popular journals and presented at popular conferences is likely to be a popular author. The objects and their relationships can be represented using a graph with nodes representing objects and links representing relationships between objects.

Figure 1:
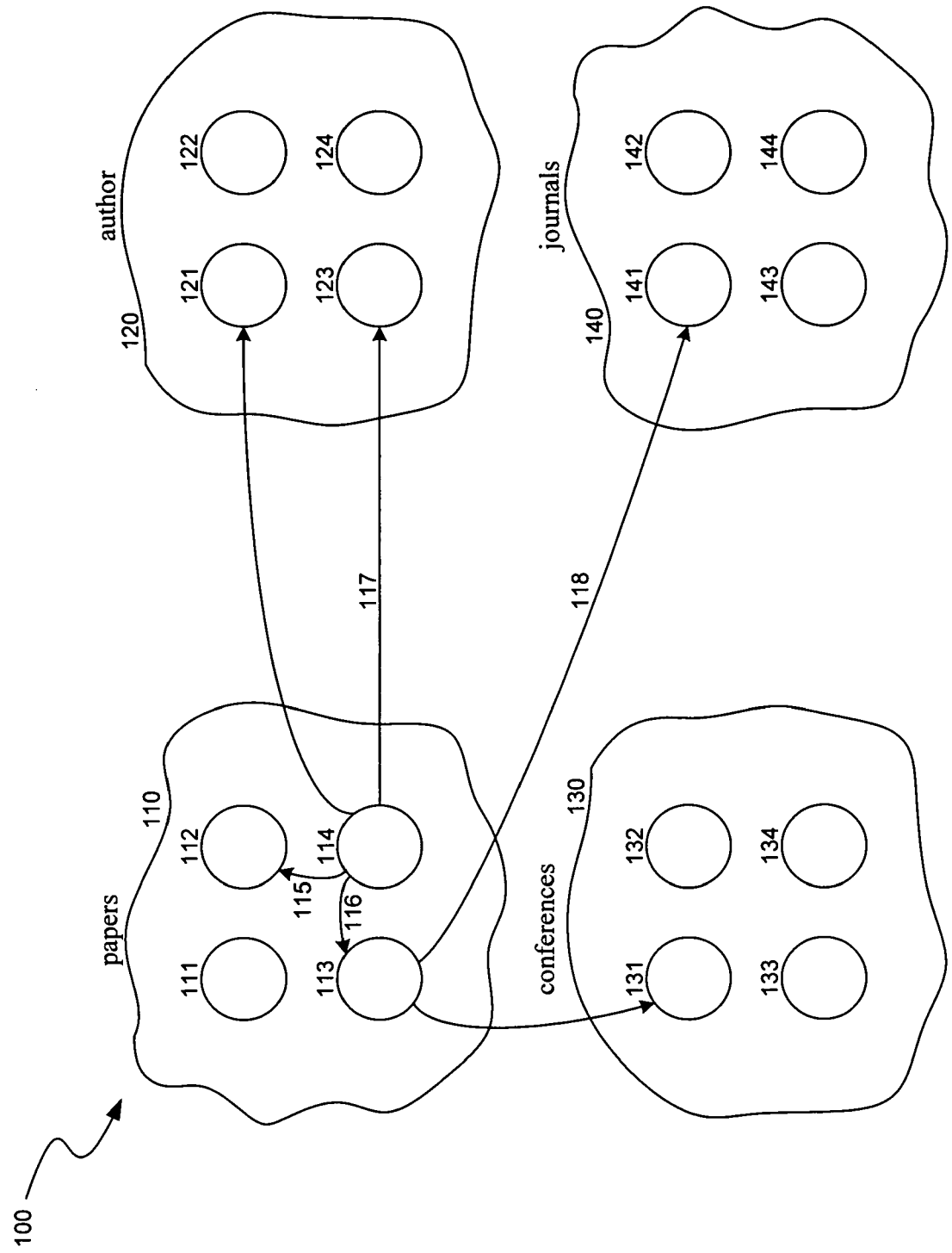
FIG. 1 is a diagram that illustrates a graph that has nodes representing objects and links representing the relationships between objects.

FIG. 1 is a diagram that illustrates a graph that has nodes representing objects and links representing the relationships between objects. A graph 100 includes paper objects 110, author objects 120, conference objects 130, and journal objects 140. The objects of the same object type are related by intra-type relationships. For example, a paper may have a "cited by" relationship with another paper. Relationship 115 may indicate that paper object 112 was cited by paper object 113. The objects of different object types are related by inter-type relationships. For example, relationship 117 may represent an "authored by" relationship between papers and authors, and relationship 118 may represent a "published in" relationship between papers and journals. The popularity of an object is based in part on the number of relationships of that object to other objects. For example, an author who authors many popular papers that are published in popular journals will have relationships with many objects and may be a popular author. The relationships between objects do not, however, contribute the same amount to the popularity of the objects. For example, the "published in" relationship between a paper and a journal will be more representative of the popularity of the paper than the "cited in" relationship between papers. To account for different contributions of relationships to the popularity of objects, the ranking system assigns a popularity propagation factor to each relationship. The popularity ranking system uses the popularity propagation factors as weights to determine the relative contributions of each relationship to the popularity of the objects.

In one embodiment, the ranking system calculates the popularity of the objects based on the popularity of the web pages that contain the objects and an object-level popularity. The ranking system may use a page ranking algorithm to determine the popularity of web pages that contain the objects. The ranking system may determine the object-level popularity of the objects based on the intra-type and inter-type relationships between the objects. The popularity of the objects in a collection of objects with different object types may be represented by the following equation:

$$R_X = \varepsilon R_{EX} + (1-\varepsilon) \sum_{\forall Y} \gamma_{YX} M_{YX}^T R_Y \qquad (1)$$

where $R_X$ and $R_Y$ are vectors of popularity scores of objects of types X and Y, $M_{YX}$ is an adjacency matrix for objects of object types X and Y, $$m_{yx} \text{ is } \frac{1}{Num(y,x)}$$

if there is a link from object y of object type Y to object x of object type X (Num(y,x) denotes the number of links from object y to any objects of object type X) and $m_{yx}$ is 0 otherwise, $\gamma_{YX}$ denotes the popularity propagation factor of the relationship from an object of type Y to an object of type X and $\Sigma_{\forall Y} \gamma_{YX} = 1$, $R_{EX}$ is a vector of web popularity scores of objects of type X, and $\varepsilon$ is a damping factor which is the probability that the "random object finder" will get bored with following links of the object relationship graph and start looking for another object through the web graph.

The ranking system calculates the popularity of the objects by iteratively calculating Equation 1 until the popularities of the objects converge on a solution. The iterative calculations are referred to as the "popularity rank algorithm." The ranking system may assume a "random object finder" model for the behavior of a reader. The "random object finder" model assumes that a reader keeps clicking on successive web page links, web page to object links, and object relationship links at random. The popularity of an object represents the probability that such a reader will select the object at any given click.

In one embodiment, the ranking system automatically calculates the popularity propagation factors for the relationships for a collection of objects. The ranking system may input a ranking of a training set of objects. For example, a domain expert may be asked to select a training set of papers and rank those papers based on their popularity. The ranking system then identifies the objects directly related to the papers (i.e., authors, journals, and conferences) and asks the domain expert to rank those objects according to their popularity. The objects in the collection ranked by the expert are training objects and have an expert ranking. The ranking system then will attempt to select popularity propagation factors that when used by the popularity rank algorithm will calculate popularities that result in rankings of the training objects that match the expert ranking as closely as possible. To select the popularity propagation factors, the ranking system iteratively selects a new combination of popularity propagation factors (i.e., one for each relationship), determines the popularity of the training objects using the selected combination, and evaluates how well the ranking based on the determined popularity (i.e., "popularity ranking") matches the expert ranking. The ranking system then selects another combination of popularity propagation factors and repeats the determining and evaluating until the popularity ranking of the training objects comes within a certain distance of the expert ranking. The ranking system then uses the selected popularity propagation factors in the popularity rank algorithm to rank all the objects. Once the objects of a corpus are ranked, the ranking can be used to order results of queries against the corpus, to identify popular or important objects, and so on.

In one embodiment, the ranking system when calculating the popularity propagation factors applies the popularity rank algorithm to only a subset of the objects in a corpus (that includes the training objects) to reduce the computation time needed. Since a corpus of objects may include many different object types with each object type having thousands of objects and having many relationships to other object types, it may take a considerable amount of computation power to perform the popularity rank algorithm. However, the effect of one object to the popularity of another object decreases as the "relationship distance" between the objects increases. The relationship distance represents the number of relationships on the shortest path between the objects. For example, if paper P is cited by paper S which is authored by author A, then paper A has a relationship distance of 1 to paper S and of 2 to author A. Thus, the popularity of the training objects can be approximated by applying the popularity rank algorithm to a subgraph that includes the training objects and those other objects that are within a certain relationship distance to a training object. The ranking system may automatically identify a relationship distance such that the popularity of the training objects can be approximated to within an acceptable accuracy by applying the popularity rank algorithm to the subgraph within that relationship distance. The ranking system identifies the relationship distance by initially applying the popularity rank algorithm to a subgraph within an initial relationship distance of the training objects. The ranking system then compares the resulting popularity ranking to the expert ranking. If the rankings are close, then the ranking system uses that relationship distance as defining the subgraph. Otherwise, the ranking system increases the relationship distance of the subgraph and repeats the application of the popularity rank algorithm until the popularity ranking is close to the expert ranking. The ranking system then uses the subgraph with that relationship distance to calculate the popularities when determining the popularity propagation factors.

Figure 2:
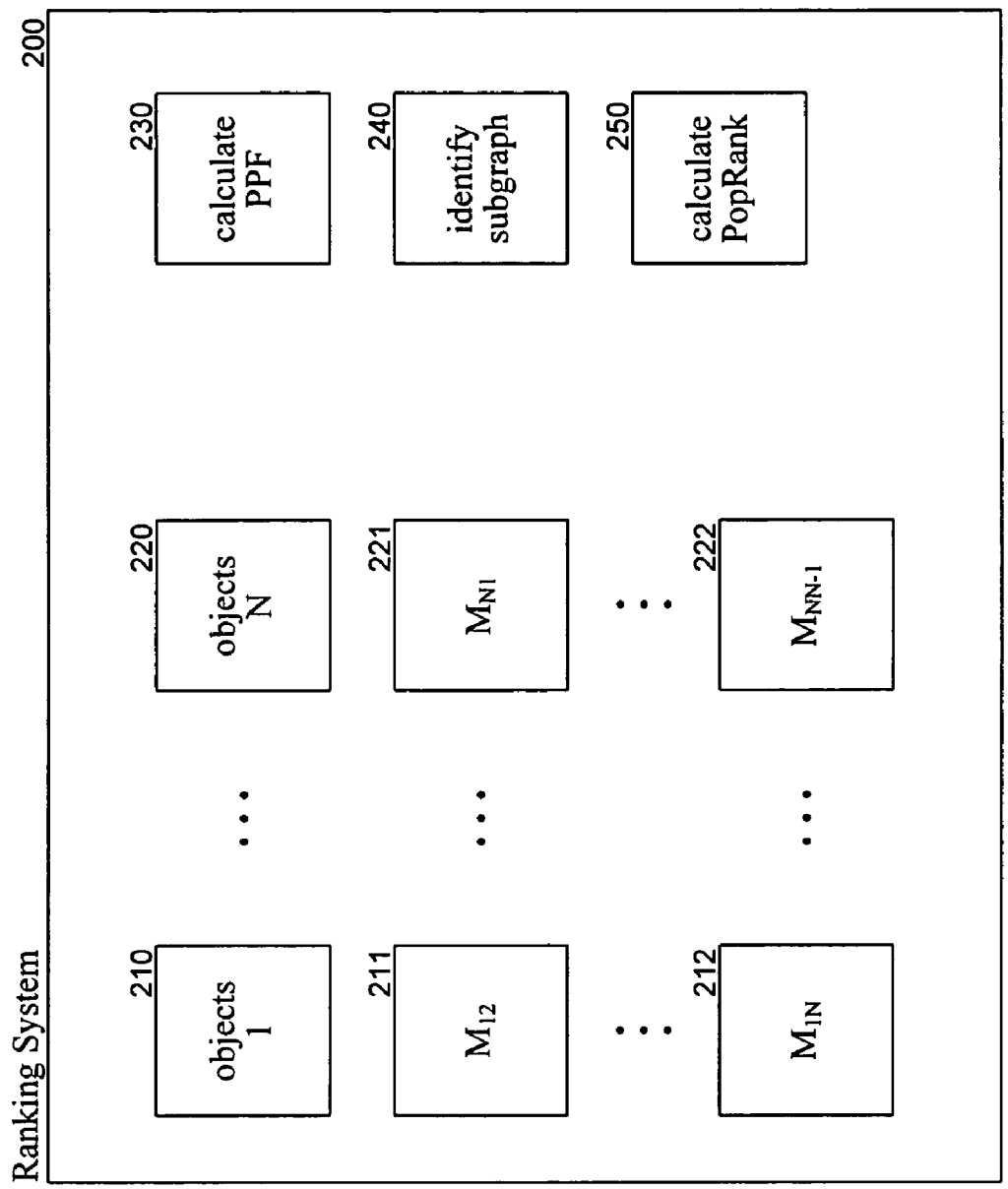
FIG. 2 is a block diagram that illustrates components of the ranking system in one embodiment.

FIG. 2 is a block diagram that illustrates components of the ranking system in one embodiment. The components of the ranking system include a calculate popularity propagation factor component 230, an identify subgraph component 240, and a calculate popularity rank component 250. The calculate popularity propagation factor component applies a simulated annealing algorithm to select a combination of popularity propagation factors that results in a ranking of the training objects that is close to or approximates the expert ranking. The calculate popularity propagation factor component may approximate the popularity of the training objects by using only a subgraph of the corpus that is within a certain relationship distance of the training objects. The identify subgraph component determines the relationship distance that should be used. The calculate popularity rank component calculates the popularity of the objects of a graph or subgraph using a set of popularity propagation factors. The calculate popularity rank component then ranks the objects based on their popularity. For example, if the popularities of papers A, B, and C are 0.01, 0.02, and 0.15, respectively, then the popularity ranking would be papers B, C, and A. The ranking system ranks objects 210 and 220 having different object types. The relationships between the objects may be represented by adjacency matrices 211-212 and 221-222. The ranking system has an adjacency matrix for each relationship. For example, the ranking system may have an adjacency matrix for the "authored by" relationship, the "cited in" relationship, the "published in" relationship, and so on. Each row of an adjacency matrix and each column of an adjacency matrix represent an object. For example, the adjacency matrix for the "authored by" relationship may include a row for each author and a column for each paper. The content of a cell indicates whether the author of that row is the author of the paper of that column.

The computing device on which the ranking system is implemented may include a central processing unit, memory, input devices (e.g., keyboard and pointing devices), output devices (e.g., display devices), and storage devices (e.g., disk drives). The memory and storage devices are computer-readable media that may contain instructions that implement the ranking system. In addition, the data structures and message structures may be stored or transmitted via a data transmission medium, such as a signal on a communications link. Various communications links may be used, such as the Internet, a local area network, a wide area network, or a point-to-point dial-up connection.

The ranking system may be implemented in various operating environments. Various well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The ranking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
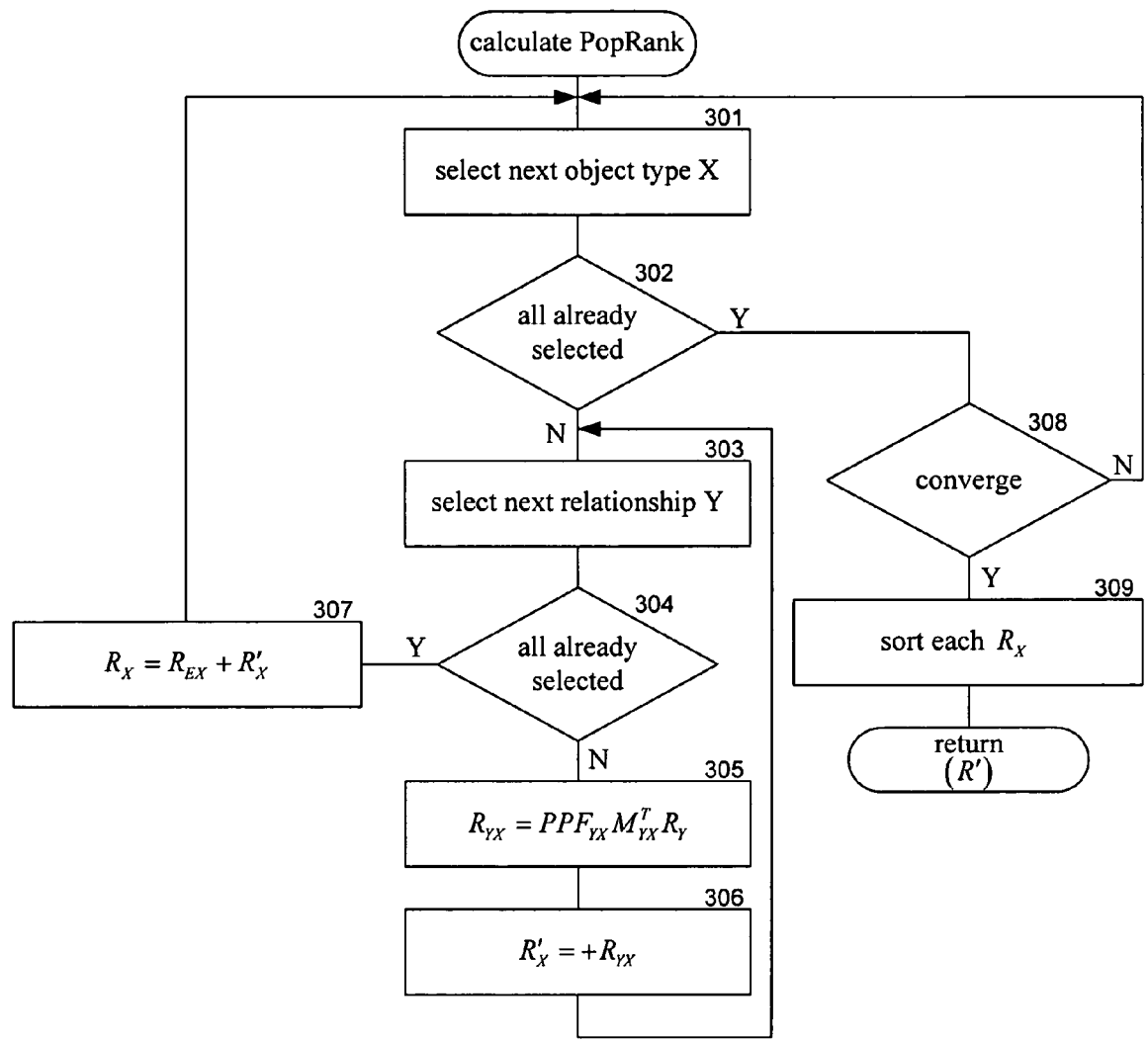
FIG. 3 is a flow diagram that illustrates the processing of the calculate popularity rank component in one embodiment.

FIG. 3 is a flow diagram that illustrates the processing of the calculate popularity rank component in one embodiment. The component implements the popularity rank algorithm by iteratively calculating the popularity of objects of a graph until the popularity converges on a solution. In blocks 301-307, the component performs one iteration of the popularity rank algorithm. In block 301, the component selects the next object type. In decision block 302, if all the object types have already been selected, then the component continues at block 308 to check if the popularity has converged on a solution, else the component continues at block 303. In blocks 303-306, the component loops calculating the contribution to the popularity of the objects of the selected object type of the object having the selected relationship to the object of the selected object type. In block 303, the component selects the next relationship for the selected object type. In block 304, if all the relationships have already been selected, then the component continues at block 307, else the component continues at block 305. In block 305, the component calculates the contribution of the objects with the selected relationship to the popularity of the objects of the selected object type. In block 306, the component maintains a running total of the contribution and then loops to block 303 to select the next relationship. In block 307, the component calculates the popularity for the objects of the selected object type and then continues at block 301 to select the next object type. In decision block 308, if the popularities of the objects of the object types have converged on a solution, then the component continues at block 309, else the component loops to block 301 to perform the next iteration. The popularities of the objects may converge on a solution when the distances between the popularities of successive iterations are within a certain range. In block 309, the component sorts the objects of each object type based on their popularities to generate their popularity rankings. The component then returns the popularity rankings.

Figure 4:
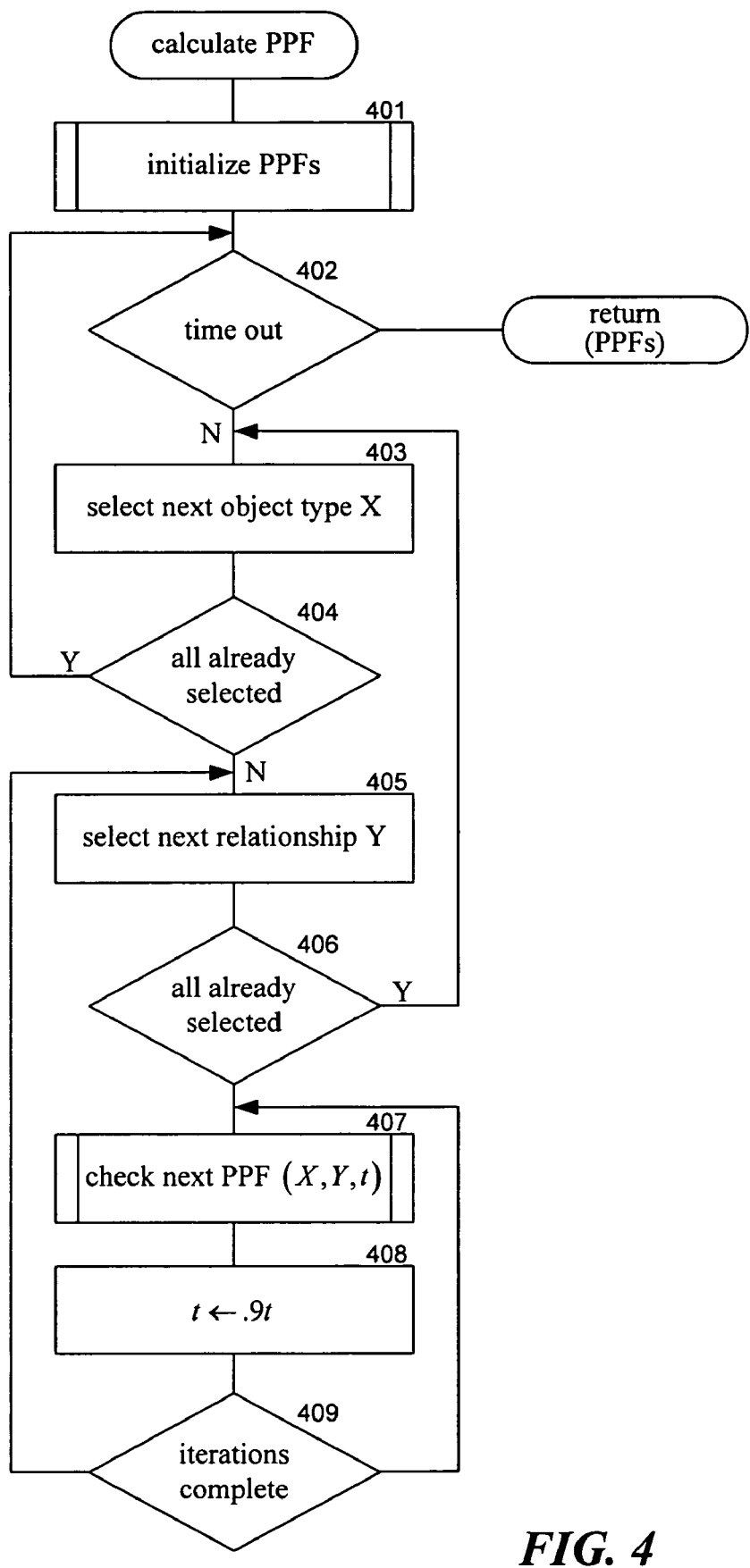
FIG. 4 is a flow diagram that illustrates the processing of the calculate popularity propagation factor component in one embodiment.

FIG. 4 is a flow diagram that illustrates the processing of the calculate popularity propagation factor component in one embodiment. The component uses a simulated annealing algorithm to identify a combination of popularity propagation factors that results in a popularity ranking of the training objects that is similar to the expert ranking of the training objects. In block 401, the component initializes the popularity propagation factors. The component may initialize the popularity propagation factors such that the sum for the relationships for a certain object type is 1. For example, if an object type has 10 relationships with other object types, then the component sets the popularity propagation factor of each relationship to 0.1 to start off with equal weights. In blocks 402-409, the component loops calculating the popularity propagation factors. In decision block 402, if the component has executed for a predetermined amount of time, then the component completes and returns the current popularity propagation factors, else the component continues at block 403. One skilled the art will appreciated that other termination conditions can be used such as when the differences between the popularity rankings and the expert rankings are within a certain threshold. In block 403, the component selects the next object type. In decision block 404, if all the object types have already been selected, then the component loops to block 402 to start the next iteration, else the component continues at block 405. In blocks 405-409, the component loops to identify a next popularity propagation factor for each relationship of the selected object type. In block 405, the component selects the next relationship for the selected object type. In decision block 406, if all the relationships have already been selected, then the component loops to block 403 to select the next object type, else the component continues at block 407. In blocks 407-409, the component loops calculating a new popularity propagation factor for the selected relationship. In block 407, the component invokes a check next popularity propagation factor component to select a next popularity propagation factor. In block 408, the component decreases a randomization variable to control the random selection of a value for the popularity propagation factor so that the selection is not constrained by a local optimum value. In decision block 409, if the iterations have completed (e.g., a fixed number), then the component continues at block 405 to select the next relationship for the selected object type, else the component loops to block 407 to perform the next iteration.

Figure 5:
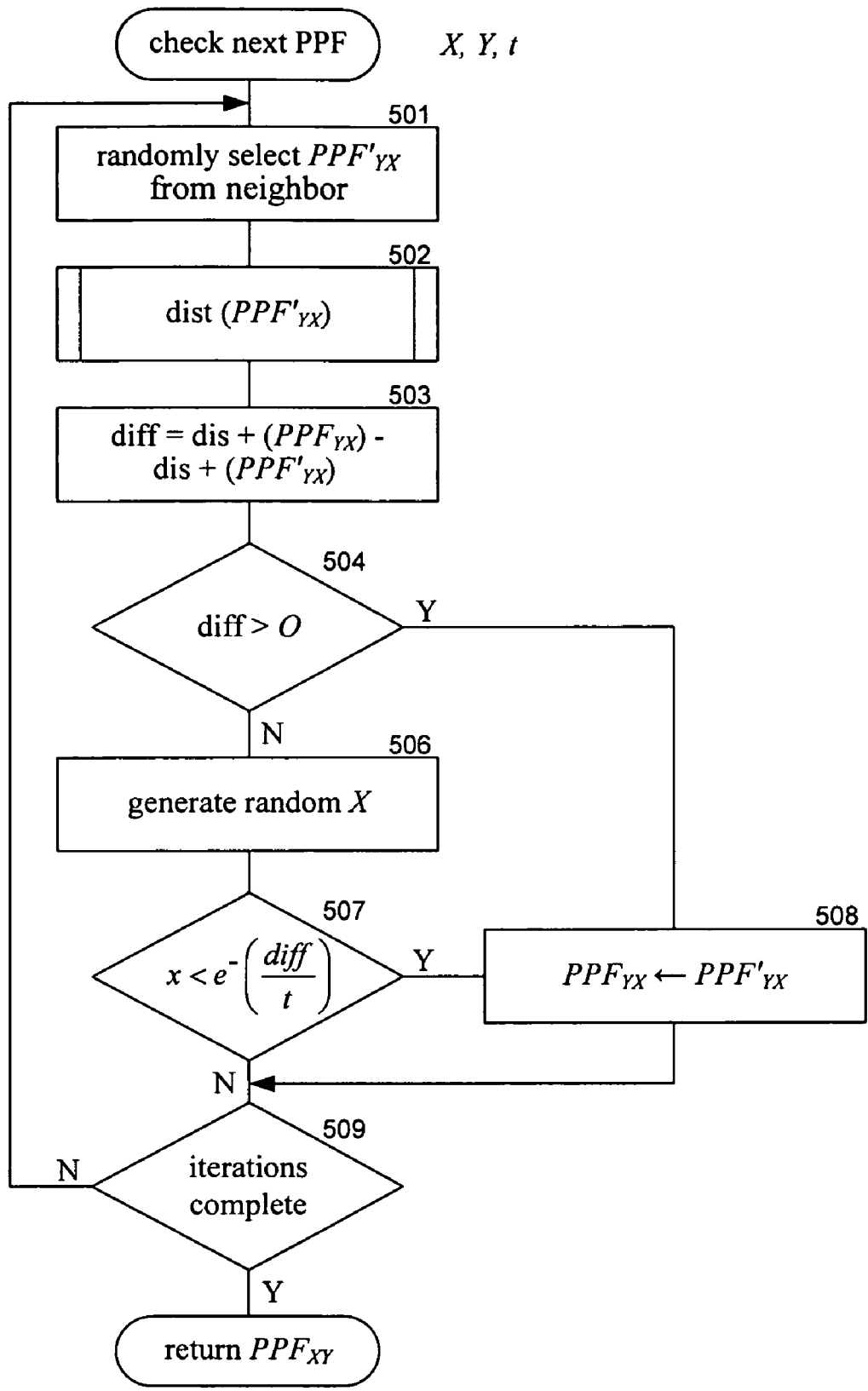
FIG. 5 is a flow diagram that illustrates the processing of the check next popularity propagation factor component in one embodiment.

FIG. 5 is a flow diagram that illustrates the processing of the check next popularity propagation factor component in one embodiment. The component is passed an indication of an object type, a relationship, and a randomization variable. The component loops randomly selecting popularity propagation factors for the relationship and determining whether the popularity rankings for the training objects would be an improvement over the popularity ranking with the current popularity propagation factors. In block 501, the component randomly selects a popularity propagation factor from a neighborhood that is within a certain range of the current popularity propagation factor. For example, the neighborhood may be within the range of −0.05 and +0.05 of the current popularity propagation factor. In block 502, the component invokes a distance component to determine the distance between the popularity ranking based on the selected popularity propagation factor and the expert ranking of the training objects. In block 503, the component determines the difference between the distances for the current popularity propagation factor and for the selected popularity propagation factor. In decision block 504, if the difference is greater than zero, then the ranking with the selected popularity propagation factor is better than the ranking with the current popularity propagation factor and the component continues at block 507, else the component continues at block 505. In block 505, the component generates a random number. In decision block 506, if a randomization condition has been met, then it is time to attempt to move off a local optimum popularity propagation factor and the component continues at block 507, else the component continues at block 508. In block 507, the component sets the current popularity propagation factor to the selected popularity propagation factor. In decision block 508, if the iterations complete condition has been satisfied, then the component returns the current popularity propagation factor, else the component loops to block 501 to start the next iteration.

Figure 6:
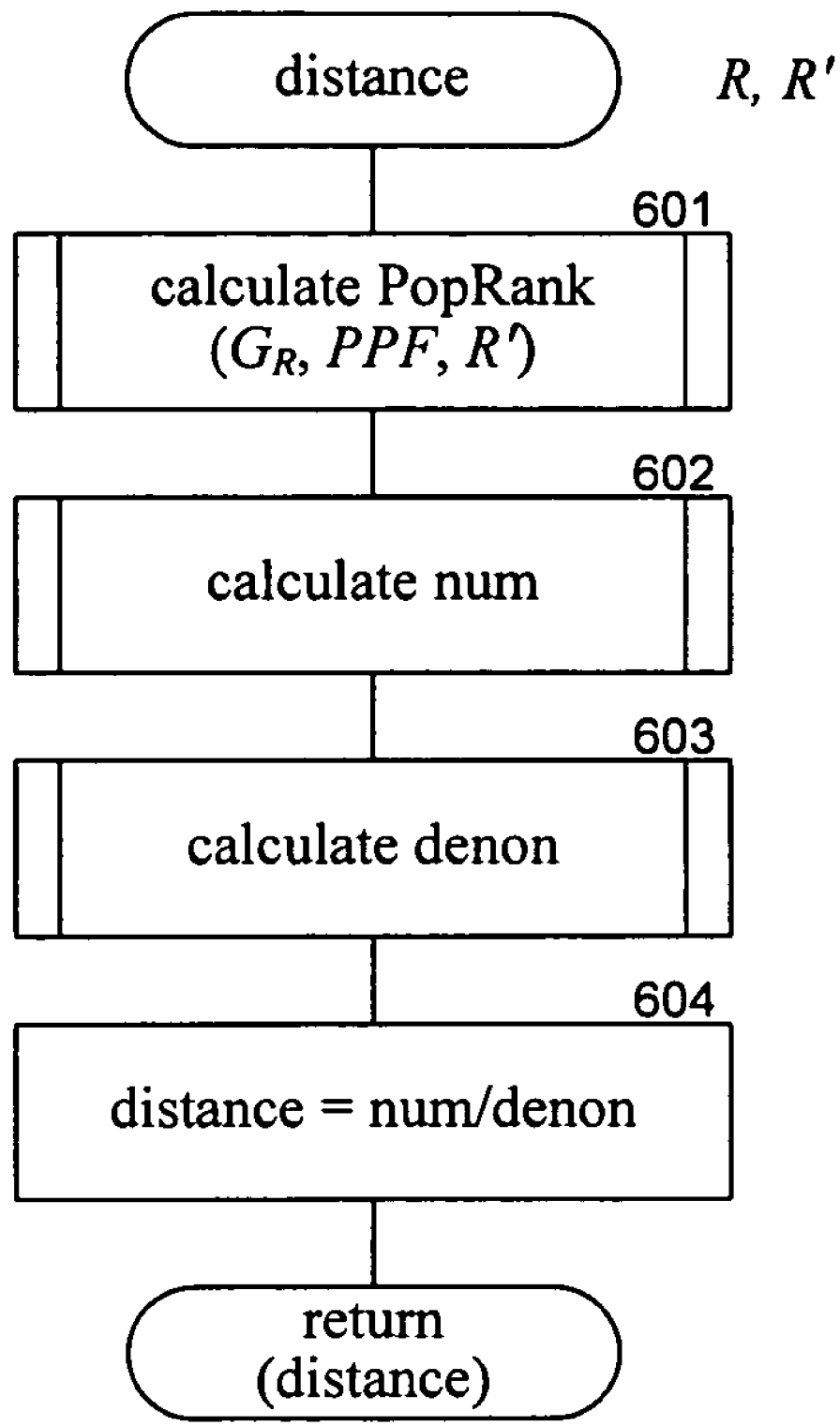
FIG. 6 is a flow diagram that illustrates the processing of the distance component in one embodiment.

FIG. 6 is a flow diagram that illustrates the processing of the distance component in one embodiment. The component is passed a graph and a set of popularity propagation factors and determines the distance of the resulting popularity rankings to the expert rankings of the training objects. The distance reflects not only the number of mismatches between the rankings but also the position of these mismatches. For example, if a popularity ranking switches the ranking of the first object and the second object, the distance between the popularity ranking and the expert ranking should be greater than that of a popularity ranking that only switched the last object and the second to the last object. The distance may be represented by the following equation:

$$D(R, R') = \frac{\sum_{i=1}^{n}\left[(n-i) \times \sum_{j=1 \wedge R'_j \notin \{R_1,\ldots,R_i\}}^{i} 1\right]}{\sum_{i=1}^{\lfloor \frac{n}{2} \rfloor}[(n-i) \times i] + \sum_{i=\lfloor \frac{n}{2} \rfloor+1}^{n}[(n-i) \times (n-i)]} \quad (2)$$

where n is the total number of objects in the ranking lists and $R_i$ is the $i^{th}$ object in ranking list R. The numerator of the equation is used to measure the real distance of these two rankings, and the denominator of the formula is used to normalize the real distance to a number between 0 and 1.

In block 601, the component invokes the calculate popularity rank component passing an indication of the subgraph and the popularity propagation factors and receiving the popularity rankings in return. In block 602, the component invokes a calculate numerator component to calculate the numerator for Equation 2. In block 603, the component invokes the calculate denominator component to calculate the denominator for Equation 2. In block 604, the component calculates the distance by dividing the numerator by the denominator. The component then returns the distance.

Figure 7:
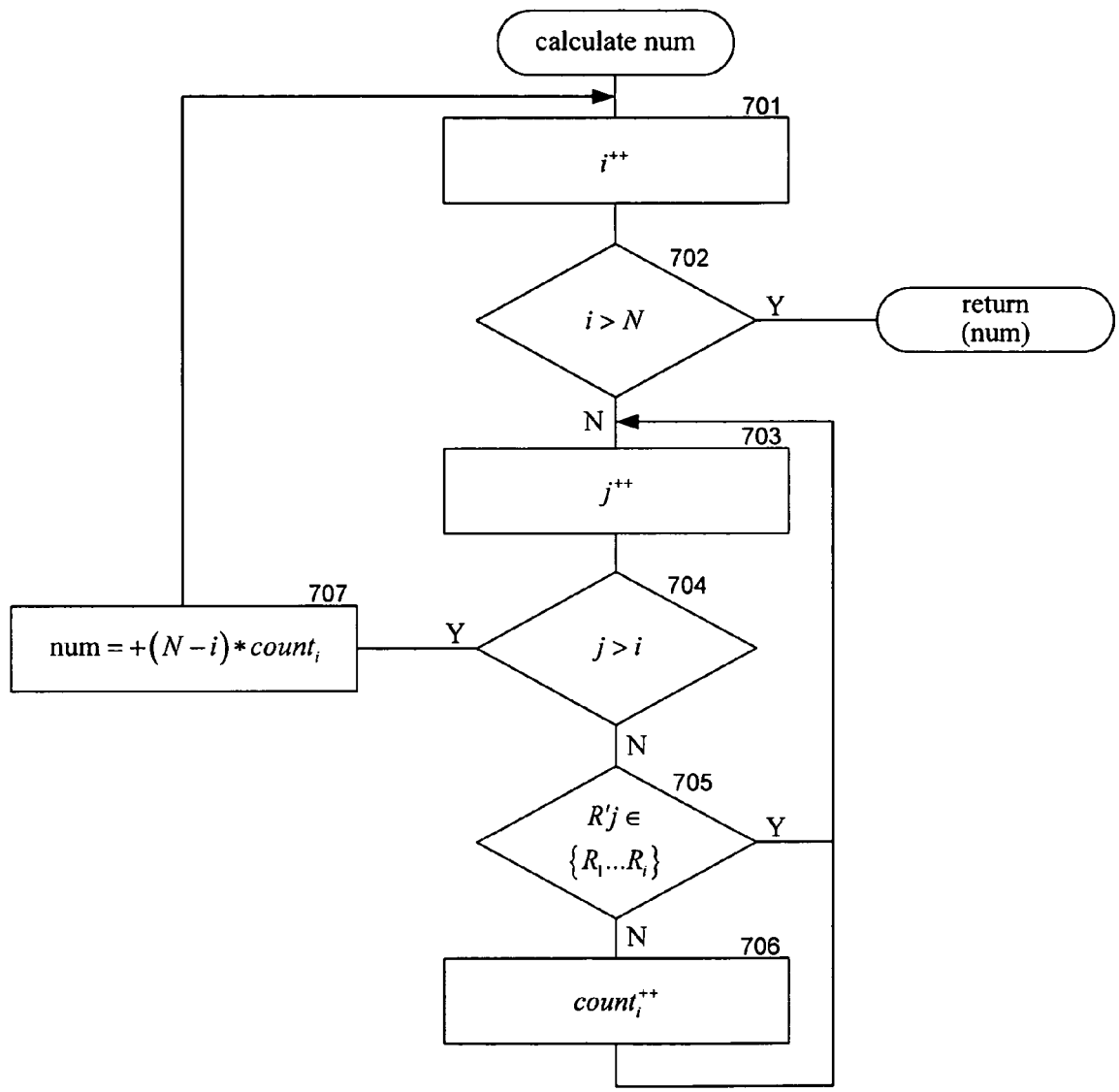
FIG. 7 is a flow diagram that illustrates the processing of the calculate numerator component in one embodiment.

FIG. 7 is a flow diagram that illustrates the processing of the calculate numerator component in one embodiment. The component is passed a popularity ranking. The component calculates the numerator for Equation 2. In block 701, the component selects the next object in the popularity ranking starting with the highest rank. In decision block 702, if all the objects have already been selected, then the component returns the numerator, else the component continues at block 703. In blocks 703-706, the component loops counting the number of objects higher in the popularity ranking that do not have a higher ranking in the expert ranking. In block 703, the component chooses the next object in the popularity ranking starting with the highest ranking. In decision block 704, if all the objects with a higher ranking than the selected object have already been chosen, then the component continues at block 707, else the component continues at block 705. In block 705, if the chosen object has a higher ranking than the selected object in the expert ranking, then the component loops to block 703 to choose the next object, else there is a mismatch and the component continues at block 706. In block 706, the component increments the count for the selected object and then loops to block 703 to choose the next object. In block 707, the component multiplies the count by the distance of the selected object from the last object in the popularity ranking and adds it to the running total of the numerator.

Figure 8:
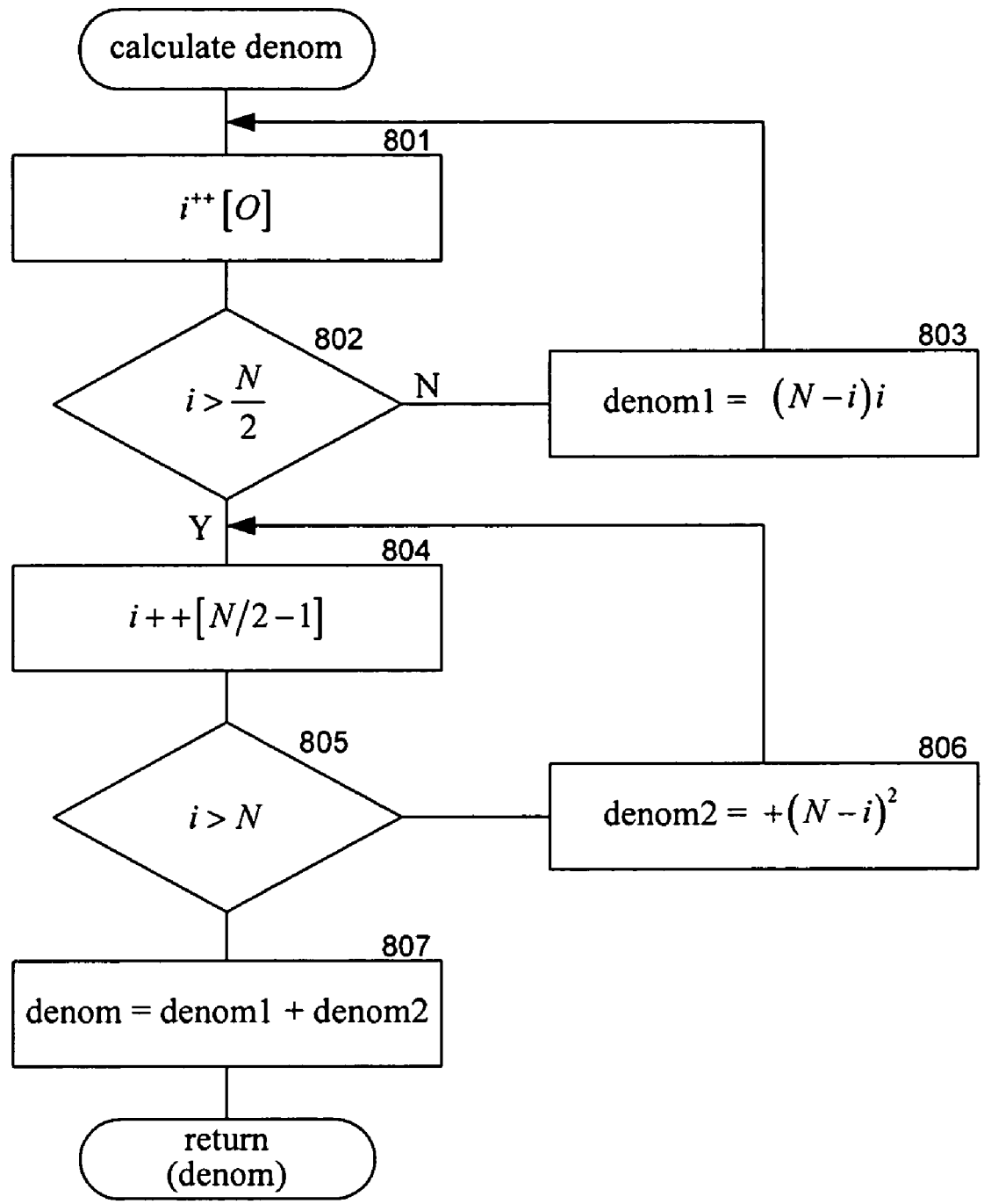
FIG. 8 is a flow diagram that illustrates the processing of the calculate denominator component in one embodiment.

FIG. 8 is a flow diagram that illustrates the processing of the calculate denominator component in one embodiment. In block 801, the component selects the next rank starting with the highest. In decision block 802, if the highest half of the ranks have already been selected, then the component continues at block 804, else the component continues at block 803. In block 803, the component multiplies the selected rank by the distance between the selected rank and the last rank and accumulates it into a first portion of the denominator and then loops to block 801 to select the next rank. In block 804, the component selects the next rank starting with the middle rank. In decision block 805, if all the ranks have already been selected, then the component continues at block 807, else the component continues at block 806. In block 806, the component calculates the square of the distance between the selected rank and the last rank and then accumulates it into the second portion of the denominator and loops to block 804 to select the next rank. In block 807, the component adds the first part of the denominator and the second part of the denominator and then returns the denominator.

Figure 9:
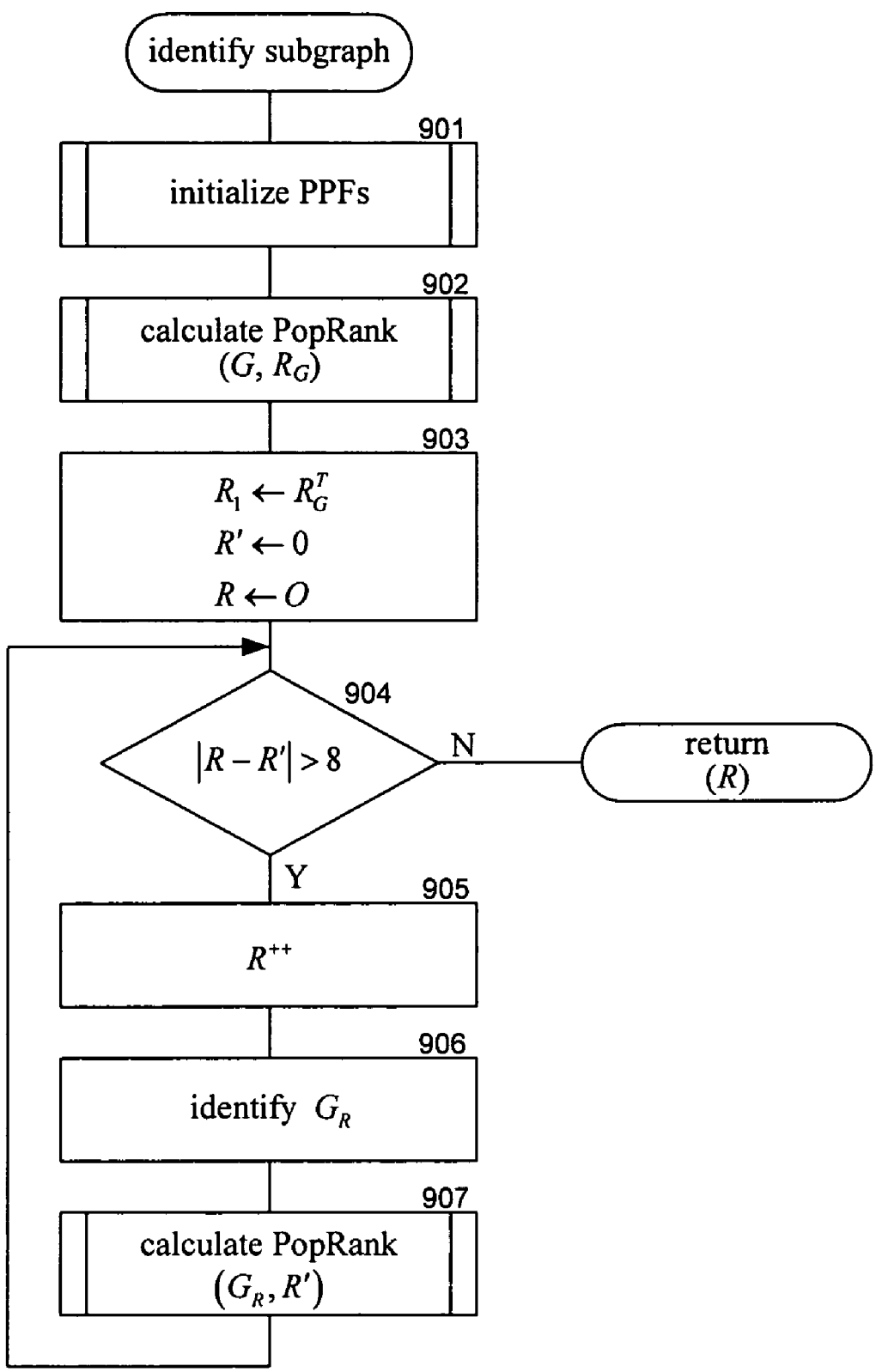
FIG. 9 is a flow diagram that illustrates the processing of the identify subgraph component in one embodiment.

FIG. 9 is a flow diagram that illustrates the processing of the identify subgraph component in one embodiment. The component starts with the subgraph of the training objects and increases the subgraph to include objects with increasing relationship distances from the training objects until the popularity ranking based on the subgraph is within a threshold of the popularity ranking for the entire graph. In block 901, the component initializes the popularity propagation factors so that each relationship for an object type has an equal weight. In block 902, the component invokes the calculate popularity rank component passing the entire graph and the initialized popularity propagation factors. The component receives the popularity ranking of the objects, which includes the ranking of the training objects, in return. In block 903, the component sets the ranking for the training objects, initializes a popularity ranking for the subgraph, and sets the relationship distance to 0. In blocks 904-907, the component loops calculating the popularity rankings for successively larger subgraphs until the difference in ranking of the training objects is within a threshold. The difference may be calculated using the distance component as described above. In decision block 904, if the difference is greater than a threshold amount, then the component continues at block 905, else the component returns the relationship distance. In block 905, the component increments the relationship distance. In block 906, the component identifies the subgraph corresponding to the selected relationship distance. In block 907, the component invokes the calculate popularity rank component to calculate the popularity of the training objects based on the selected subgraph. The component then loops to block 904 to check the difference.

One skilled in the art will appreciate that although specific embodiments of the ranking system have been described herein for purposes of illustration, various modifications may be made without deviating from the spirit and scope of the invention. One skilled in the art will appreciate that an "expert" ranking refers to any ranking of objects of training objects and may be considered "goal" or "ideal" or "actual" rankings. The ranking of objects of different types is described in U.S. patent application Ser. No. 10/846,835, entitled "Method and System for Ranking Objects Based on Intra-Type and Inter-Type Relationships" and filed on May 14, 2004, which is hereby incorporated by reference. The identifying of web objects of different types is described in U.S. patent application Ser. No. 11.106.383, entitled "Method and System for Identifying Object Information" and being filed concurrently, which is hereby incorporated by reference. Accordingly, the invention is not limited except as by the appended claims.

We claim:

1. A method in a computer system for ranking objects, each object having an object type, the method comprising:
   providing an indication of relationship types between objects having different object types, each relationship type having a popularity propagation factor;

calculating the popularity propagation factors for each relationship type by:
  providing training objects of the different object types along with an indication of relationships between the training objects;
  for each object type, receiving an expert ranking of training objects of that object; and
  determining popularity propagation factors for the relationship types so that the determining of the popularity of the training objects using the popularity propagation factors results in a popularity ranking of the training objects that approximates the received expert ranking;
providing an indication of objects of different object types along with an indication of the relationships between the objects; and
determining the popularity of the objects based on the indicated relationships between objects of the different object types and the calculated popularity propagation factors of the relationship types between objects having different object types wherein the ranking of the objects is based on the determined popularities.

2. The method of claim 1 including providing a web-based popularity for the objects and wherein the determining of the popularity of the objects factors in the web-based popularity.

3. The method of claim 2 wherein the web-based popularity of an object is based on links to web pages associated with the object.

4. The method of claim 1 wherein a relationship between objects is indicated by an adjacency matrix for the relationship that specifies whether the relationship exists for pairs of objects.

5. The method of claim 1 wherein the calculation of popularity propagation factors includes repeatedly selecting different combinations of the popularity propagation factors and evaluating how well a popularity ranking based on the combination approximates the received expert ranking.

6. The method of claim 5 wherein the evaluating of the popularity ranking includes determining popularity using a subgraph of the objects that includes the training objects and other objects with a certain relationship distance from the training objects.

7. The method of claim 1 wherein the calculation of popularity propagation factors is based on a simulated annealing algorithm.

8. A method in a computer system for ranking objects, each object having an object type, the method comprising:
  providing relationships between object types, each relationship having a popularity propagation factor;
  indicating when an object has a relationship to another object; and
  determining popularity of the objects based on the indicated relationships between objects and the popularity propagation factors of the relationships wherein the ranking of the objects is based on the determined popularities
wherein the popularity of objects is represented as:

$$R_X = \varepsilon R_{EX} + (1-\varepsilon)\sum_{\forall Y} \gamma_{YX} M_{YX}^T R_Y$$

where $R_X$ and $R_Y$ are vectors of popularity scores of objects of types X and Y, $M_{YX}$ is an adjacency matrix for objects of object types X and Y, $m_{yx}$ is $\frac{1}{Num(y,x)}$ if there is a link from object y of object type Y to object x of object type X (Num(y,x) denotes the number of links from object y to any objects of object type X) and $M_{yx}$ is 0 otherwise, $\gamma_{YX}$ denotes the popularity propagation factor of the relationship from an object of type Y to an object of type X and $\sum_{\forall Y} \gamma_{YX}=1$, $R_{EX}$ is a vector of web popularity scores of objects of type X, and $\varepsilon$ is a damping factor.

9. A computer-readable storage medium containing instructions for controlling a computer system to calculate weights for relationship types between different object types, by a method comprising:
  providing training objects of different object types along with an indication of relationships between the training objects;
  for each object type, receiving an expert ranking of the training objects of that object type;
  selecting a combination of weights for the relationship types;
  determining a popularity for each training object based on the selected combination of weights; and
  evaluating closeness between popularity rankings based on how rankings based on the determined popularities of the training objects correspond to the received expert rankings of the training objects
wherein the selecting, determining, and evaluating are repeated until the popularity rankings are within a threshold closeness of the received expert rankings.

10. The computer-readable storage medium of claim 9 wherein the determining of the popularity is based on the training objects and other objects a certain relationship distance from the training objects.

11. The computer-readable storage medium of claim 10 wherein the certain relationship distance is identified by selecting weights for the relationship types and repeatedly determining the popularities of the training objects and the other objects within the certain relationship distance and increasing the certain relationship distance until the popularity rankings based on the determined probabilities are close to the expert rankings.

12. A computer-readable storage medium containing instructions for controlling a computer system to calculate weights for relationships between object types, by a method comprising:
  for each object type, receiving an expert ranking of objects of that object type;
  selecting a combination of weights for the relationships;
  determining a popularity for each object based on the selected combination of weights; and
  evaluating closeness between popularity rankings based on how the determined popularities correspond to the received expert rankings
wherein the selecting, determining, and evaluating are repeated until the popularity rankings are within a threshold closeness of the expert rankings and
wherein the popularity of each object is represented by the following equation:

$$R_X = \varepsilon R_{EX} + (1-\varepsilon)\sum_{\forall Y} \gamma_{YX} M_{YX}^T R_Y$$

where $R_X$ and $R_Y$ are vectors of popularity scores of objects of types X and Y, $M_{YX}$ is an adjacency matrix for objects of object types X and Y, $$m_{yx} \text{ is } \frac{1}{Num(y,x)}$$

if there is a link from object y of object type Y to object x of object type X (Num(y,x) denotes the number of links from object y to any objects of object type X) and $m_{yx}$ is 0 otherwise, $\gamma_{YX}$ denotes the popularity propagation factor of the relationship from an object of type Y to an object of type X and $\Sigma_{\forall Y} \gamma_{YX} = 1$, $R_{EX}$ is a vector of web popularity scores of objects of type X, and $\epsilon$ is a damping factor.

13. A method in a computer system for identifying a subset of objects with relationships to training objects, the method comprising:
providing objects of different types with relationships between the objects;
for each object type, receiving an expert ranking of training objects of that object type;
selecting a subset of objects that includes the training objects;
determining the popularities of the objects in the selected subset of objects based on the relationships between objects in the selected subset of objects; and
comparing popularity rankings of the training objects derived from the determined popularity of the objects to the expert rankings
wherein the selecting, determining, and comparing are repeated for subsets that include increasingly more objects until the comparison indicates the popularity rankings are close to the expert rankings.

14. The method of claim 13 wherein the determining of the popularities of the objects is further based on popularity propagation factors of relationships between object types.

15. The method of claim 14 wherein the popularity propagation factors for the relationships for an object type are set to be equal.

16. A method in a computer system for identifying a subset of objects with relationships to training objects, the method comprising:
providing objects of different types with relationships between the objects;
for each object type, receiving an expert ranking of training objects of that object type;
selecting a subset of objects that includes the training objects;
determining the popularities of the objects in the selected subset objects based on the relationships between objects in the selected subset of objects; and
comparing popularity rankings of the training objects derived from the determined popularity of the objects to the expert rankings
wherein the selecting, determining, and comparing are repeated for subsets that include increasingly more objects until the comparison indicates the popularity rankings are close to the expert rankings and
wherein the popularity of an object is represented by the following equation:

$$R_X = \varepsilon R_{EX} + (1-\varepsilon)\sum_{\forall Y} \gamma_{YX} M_{YX}^T R_Y$$

where $R_X$ and $R_Y$ are vectors of popularity scores of objects of types X and Y, $M_{YX}$ is an adjacency matrix for objects of object types X and Y, $$m_{yx} \text{ is } \frac{1}{Num(y,x)}$$

if there is a link from object y of object type Y to object x of object type X (Num(y,x) denotes the number of links from object y to any objects of object type X) and $m_{yx}$ is 0 otherwise, γYX denotes the popularity propagation factor of the relationship from an object of type Y to an object of type X and $\Sigma_{\forall Y} \gamma_{YX} = 1$, $R_{EX}$ is a vector of web popularity scores of objects of type X, and $\epsilon$ is a damping factor.

17. The method of claim 13 including using the identified subset to evaluate closeness between popularity rankings of the training objects based on the determined popularity and based on various combinations of popularity propagation factors and the expert rankings.

18. The method of claim 13 wherein a selected subset of objects includes the training objects having a relationship to the training objects within a certain relationship distance.

* * * * *

UNITED STATES PATENT AND TRADEMARK OFFICE
CERTIFICATE OF CORRECTION

PATENT NO.       : 7,577,650 B2
APPLICATION NO.  : 11/106017
DATED            : August 18, 2009
INVENTOR(S)      : Wen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Seventh Day of September, 2010

David J. Kappos
*Director of the United States Patent and Trademark Office*